US012238578B2

(12) United States Patent
Henry et al.

(10) Patent No.: US 12,238,578 B2
(45) Date of Patent: *Feb. 25, 2025

(54) LOAD-BALANCER FOR SATURATED WIRELESS

(71) Applicant: Cisco Technology, Inc., San Jose, CA (US)

(72) Inventors: Jerome Henry, Pittsboro, NC (US); Vinay Saini, Karnataka (IN); Sowbhagya Hanumaiah Sowmya, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/171,462

(22) Filed: Feb. 20, 2023

(65) Prior Publication Data

US 2023/0199559 A1 Jun. 22, 2023

Related U.S. Application Data

(63) Continuation of application No. 17/010,032, filed on Sep. 2, 2020, now Pat. No. 11,589,263.

(51) Int. Cl.
*H04W 28/086* (2023.01)
*H04W 16/14* (2009.01)
(Continued)

(52) U.S. Cl.
CPC ......... *H04W 28/086* (2023.05); *H04W 16/14* (2013.01); *H04W 24/08* (2013.01); *H04W 72/52* (2023.01)

(58) Field of Classification Search
CPC ........ H04B 3/46; H04W 16/14; H04W 24/08; H04W 28/086; H04W 72/52
See application file for complete search history.

(56) References Cited

U.S. PATENT DOCUMENTS 10,271,351 B1 * 4/2019 Wang .................... H04L 5/0091
11,589,263 B2 * 2/2023 Henry ................. H04W 28/086
(Continued)

FOREIGN PATENT DOCUMENTS

WO   WO-2014114082 A1 *  7/2014  ............ H04W 28/08
WO   WO-2021137744 A1 *  7/2021  ............ H04W 16/10

OTHER PUBLICATIONS

Chen et al., "Multi-Mode Wireless Apparatus and Methods of Operation", IEEE Communications Magazine • Nov. 2015, Total pp. 8 (Year: 2015).*

(Continued)

*Primary Examiner* — Shah M Rahman
(74) *Attorney, Agent, or Firm* — Merchant & Gould P.C.

(57) ABSTRACT

Load balancing for saturated wireless may be provided. A computing device may determine that an Access Point (AP) has reached a saturation point. A first Service Device (SD) having a first SD coverage area that overlaps an AP coverage area associated with the AP may be identified. Then a license to operate within a frequency spectrum segment for the first SD coverage area may be obtained. A plurality of user devices may be moved from the AP to the first SD. The first SD may then service the plurality of user devices using at least a portion of the frequency spectrum segment.

20 Claims, 4 Drawing Sheets

(51) Int. Cl.
*H04W 24/08* (2009.01)
*H04W 72/52* (2023.01)

(56) References Cited

U.S. PATENT DOCUMENTS

| | | | |
|---|---|---|---|
| 2018/0288662 A1* | 10/2018 | Diwane | H04W 36/30 |
| 2019/0058999 A1 | 2/2019 | Gunasekara et al. | |
| 2019/0104432 A1* | 4/2019 | Dhanapal | H04W 76/50 |
| 2019/0115950 A1* | 4/2019 | Kakinada | H04W 76/15 |
| 2019/0141713 A1 | 5/2019 | Cimpu et al. | |
| 2019/0150134 A1* | 5/2019 | Kakinada | H04W 16/14 |
| | | | 370/330 |
| 2019/0223025 A1 | 7/2019 | Kakinada et al. | |
| 2019/0306773 A1* | 10/2019 | Kakinada | H04W 36/1443 |
| 2019/0364492 A1 | 11/2019 | Azizi et al. | |
| 2019/0364565 A1 | 11/2019 | Hmimy et al. | |
| 2019/0394704 A1* | 12/2019 | Lou | H04W 16/14 |
| 2020/0037211 A1* | 1/2020 | Hinc | H04W 36/0009 |
| 2020/0053545 A1* | 2/2020 | Wong | H04W 8/08 |
| 2020/0196341 A1 | 6/2020 | Mishra et al. | |
| 2020/0213862 A1* | 7/2020 | Sevindik | H04W 72/541 |
| 2020/0259896 A1* | 8/2020 | Sachs | H04W 56/0065 |
| 2020/0305159 A1 | 9/2020 | Raghothaman et al. | |
| 2021/0022009 A1* | 1/2021 | De Sousa Chaves | |
| | | | H04W 76/25 |
| 2021/0029717 A1* | 1/2021 | Sevindik | H04W 48/20 |
| 2021/0058796 A1* | 2/2021 | Gandhi | H04W 28/16 |
| 2021/0068025 A1* | 3/2021 | Shukla | H04W 16/14 |
| 2021/0204169 A1* | 7/2021 | Sevindik | H04W 24/10 |
| 2021/0227628 A1* | 7/2021 | Sevindik | H04W 76/19 |
| 2021/0258822 A1* | 8/2021 | Mukherjee | H04L 1/1835 |
| 2021/0282025 A1* | 9/2021 | Bandyopadhyay | H04W 36/24 |
| 2021/0344432 A1* | 11/2021 | Balachandran | H04W 16/14 |
| 2021/0352487 A1* | 11/2021 | Routt | H04W 72/542 |
| 2021/0352488 A1* | 11/2021 | Khawer | H04W 88/14 |
| 2022/0007198 A1* | 1/2022 | Mahalingam | H04W 16/20 |
| 2022/0217798 A1* | 7/2022 | Wang | H04W 72/23 |
| 2022/0240304 A1 | 7/2022 | Wang et al. | |
| 2022/0264312 A1 | 8/2022 | Furuichi | |

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.10.0 (Sep. 2015), p. 248, Total pp. 2 (Year: 2015).*

3Gpp, "3rd Generation Partnership Project; Technical Specification Group Radio Access Network; NR; User Equipment (UE) radio access capabilities (Release 15)", 3GPP TS 38.306 V15.10.0 (Jul. 2020), pp. 10-11, 18-19, 5, 56, Total pp. 7 (Year: 2020).*

3GPP, "3rd Generation Partnership Project; Technical Specification Group Radio Access Network; NR; User Equipment (UE) radio transmission and reception; Part 1: Range 1 Standalone (Release 15)", 3GPP TS 38.101-1 V15.10.0 (Jun. 2020), p. 18, Total pp. 2 (Year: 2020).*

Cacciapuoti A.S., et al., "Software Defined Network Controlled Switching Between Millimeter Wave And Terahertz Small Cells," arXivpreprintarXiv:1702.027759, Feb. 9, 2017, pp. 1-14.

Chen T., et al., "Software Defined Mobile Networks: Concept, Survey, and Research Directions," IEEE Communication Magazine, Nov. 2015, vol. 53, No. 11, pp. 126-133.

Kibria M.G., et al., "Shared Spectrum Access Communications: A Neutral Host Micro Operator Approach," IEEE Journal On Selected Areas In Communications, Aug. 2017, vol. 35, No. 8, pp. 1741-1753.

* cited by examiner

LOAD-BALANCER FOR SATURATED WIRELESS

RELATED APPLICATION

This application is continuation of U.S. patent application Ser. No. 17/010,032 filed Sep. 2, 2020, now U.S. Pat. No. 11,589,263, the disclosure of which is incorporated herein by reference in its entirety.

TECHNICAL FIELD

The present disclosure relates generally to load balancing for Wireless.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
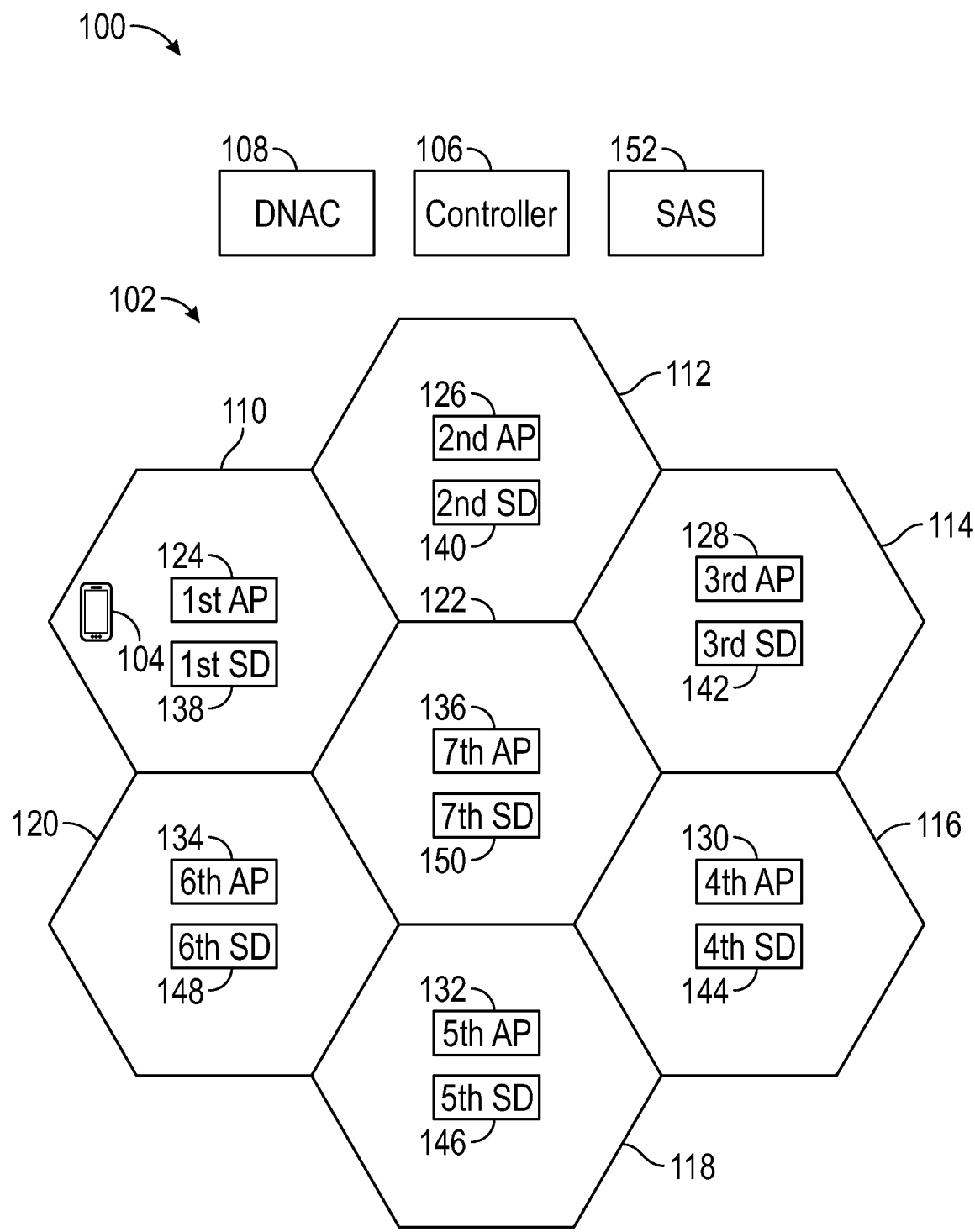
FIG. 1 is a block diagram of wireless network.

Load balancing for saturated wireless may be provided. A computing device may determine that an Access Point (AP) has reached a saturation point. A first Service Device (SD) having a first SD coverage area that overlaps an AP coverage area associated with the AP may be identified. Then a license to operate within a frequency spectrum segment for the first SD coverage area may be obtained. A plurality of user devices may be moved from the AP to the first SD. The first SD may then service the plurality of user devices using at least a portion of the frequency spectrum segment.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Wi-Fi may be used as an access technology for indoor environments. In public venues (e.g., stadiums, convention centers, etc.), user and AP density may be high. Due to the limited number and width of Wi-Fi channels, high user density may result in individual client device performance degradation. This degradation may be temporary (i.e., at game time in a stadium, at peak times at conventions etc.). In these conditions, careful Radio Frequency (RF) design may not be sufficient to ensure continued performance. Moreover, this degradation may be an issue for Wi-Fi critical assets (e.g., wireless cameras, security staff, operational staff, etc.) that may have a need to be prioritized. Accordingly, there may be a need for a process that may allow offloading and distributing clients between different radio or access technologies for better user experiences.

Consequently, embodiments of the disclosure may provide a process to distribute client devices between Wi-Fi and Citizens Broadband Radio Service (CBRS) by analyzing the radio and channel conditions, client experience, and available spectrum in a combination Wi-Fi and CBRS system. Embodiments of the disclosure may further provide a process to dynamically request and use CBRS based on environmental conditions. Citizens Broadband Radio Service Devices (CBSDs) may comprise devices capable of providing CBRS.

The United States (US) Federal Communications Commission (FCC) created the CBRS, allocating radio spectrum in the 3550-3700 MHz band (e.g., 3.5 GHz band), for shared wireless broadband to be used by enterprises under certain sharing regulations. Enterprises may use this CBRS spectrum to set up private networks and allow access to client devices. Enterprises may expand and increase the coverage density of networks by integrating CBRS into their wireless connectivity services.

CBRS opens another 150 MHz of the spectrum that may be used for public use-cases. CBRS is a band of radio-frequency spectrum that the FCC has designated for sharing among three tiers of users: i) incumbent users; ii) Priority Access Licensees (PALs), and iii) Generally Authorized Access (GAA), which may be unlicensed. The incumbent users may be those who have historically held exclusive rights to the band (e.g., satellite ground stations and the US Navy). Priority licenses may allow licensees to use the CBRS band in particular US counties so long as they do not interfere with the incumbent users and tolerate interference from the incumbent users. GAA may give users the right to use the band as long as they do not interfere with incumbent users or PALs (i.e., the other two categories of users). Embodiments of the disclosure may be used with other regulatory domains that have also open frequencies with a similar process and is not limited to the aforementioned FCC structure on any other structures by other regulatory domains.

CBRS, like Wi-Fi, may face challenges of interference from other installations in a near vicinity. Embodiments of the disclosure may utilize a light license scheme. Some systems may have access priority and all CBRDs may implement an Environmental Sensing Capability (ESC) and vacate CBRS frequencies used by priority incumbent users when detected. Additionally, some actors may buy the right to prioritized licenses (i.e., PALs) to some frequencies in some areas when no primary incumbent users are detected. Other users may use available frequencies using GAA by which the CBSD may request and may be allocated spectrum on-demand (i.e., temporarily) from a Spectrum Access Service (SAS) that may comprise a central database. Spectrum may then be allocated for a zone. The zone's size may depend on the CBSD's characteristics and an assumption of "free path loss" (e.g., in which obstacles are ignored), for a configurable time for example. A user of the temporal spectrum may be charged based on the utilization time and slice (i.e., bandwidth) size by an entity providing the access.

Embodiments of the disclosure may measure saturation levels in Wi-Fi and engage the CBRS in a way that saves costs and provides better results to users in a high-density environment (e.g., venue) for example. Processes consistent with embodiments of the disclosure may allow coordination between Wi-Fi and CBRS to use CBRS on-demand with intelligent chunk allocations. With the Wi-Fi spectrum becoming congested and CBRS available for a price, such a process may be advantageous.

FIG. 1 shows a block diagram of wireless network 100 for providing load balancing for saturated wireless. As shown in FIG. 1, wireless network 100 may comprise a plurality of cells 102 in which a client device 104 may roam. Plurality of cells 102 may have a corresponding plurality of wireless Access Points (APs) and Service Devices (SDs) that may establish a Wireless Local Area Network (WLAN) in order to provide client device 104 network connectivity. Wireless network 100 may be provided in a public venue (e.g., stadiums, convention centers, etc.). While one client device 104 is shown in FIG. 1, a plurality of client devices may be used in conjunction with wireless network 100.

Site specific policies may be provisioned on a Wireless Local Area Network controller (WLC) 106 for the plurality of APs and the plurality of SDs to join wireless network 100 and to allow WLC 106 to control wireless network 100. Consistent with embodiments of the disclosure, a Digital Network Architecture Center (DNAC) 108 (i.e., a Software-Defined Network (SDN) controller) may configure information for wireless network 100 in order to provide load balancing for saturated Wi-Fi.

Plurality of cells 102 may comprise a first cell 110, a second cell 112, a third cell 114, a fourth cell 116, a fifth cell 118, a sixth cell 120, and a seventh cell 122. First cell 110 may correspond to a first AP 124, second cell 112 may correspond to a second AP 126, third cell 114 may correspond to a third AP 128, fourth cell 116 may correspond to a fourth AP 130, fifth cell 118 may correspond to a fifth AP 132, sixth cell 120 may correspond to a sixth AP 134, and seventh cell 122 may correspond to a seventh AP 136. First cell 110 may correspond to a first Service Device (SD) 138, second cell 112 may correspond to a second SD 140, third cell 114 may correspond to a third SD 142, fourth cell 116 may correspond to a fourth SD 144, fifth cell 118 may correspond to a fifth SD 146, sixth cell 120 may correspond to a sixth SD 148, and seventh cell 122 may correspond to a seventh SD 150. While FIG. 1 shows the APs and the SDs having congruent cells in wireless network 100, the APs and the SDs may have respective different, but overlapping coverage areas.

As stated above and shown in FIG. 1, wireless network 100 may comprise Wi-Fi APs (i.e., first AP 124, second AP 126, third AP 128, fourth AP 130, fifth AP 132, sixth AP 134, seventh AP 136) that may be configured to support a wireless (e.g., Wi-Fi) hotspot. The Wi-Fi hotspot may comprise a physical location where a user, operating client device 104, may obtain access to wireless network 100 (e.g., Internet access), using Wi-Fi technology, via a WLAN using a router connected to a service provider.

Furthermore, as stated above and shown in FIG. 1, wireless network 100 may comprise SDs. The SD's may function similarly to the APs, however, the SD's may operate in a frequency band that may require a license to operate within. For example, the SDs may comprise, but are not limited to, Citizens Broadband Radio Service Devices (CBSDs) that utilize Citizens Band Radio Service (CBRS) that may be configured to support a wireless hotspot. The wireless hotspot may comprise a physical location where a user, operating client device 104, may obtain access to wireless network 100 (e.g., Internet access), using CBRS technology, via a WLAN using a router connected to a service provider.

In other embodiments of the disclosure, rather than APs, devices may be used that may be connected to a cellular network that may communicate directly and wirelessly with end use devices (e.g., client device 104) to provide access to wireless network 100 (e.g., Internet access). For example, these devices may comprise, but are not limited to, eNodeBs (eNBs) or gNodeBs (gNBs). The aforementioned cellular network may comprise, but is not limited to, a Long Term Evolution (LTE) broadband cellular network, a Fourth Generation (4G) broadband cellular network, or a Fifth Generation (5G) broadband cellular network, operated by a service provider. Notwithstanding, embodiments of the disclosure may use wireless communication protocols using, for example, Wi-Fi technologies, cellular networks, or any other type of wireless communications.

Client device 104 may comprise, but is not limited to, a phone, a smartphone, a digital camera, a tablet device, a laptop computer, a personal computer, a mobile device, a sensor, an Internet-of-Things (IoTs) device, a cellular base station, a telephone, a remote control device, a set-top box, a digital video recorder, a cable modem, a network computer, a mainframe, a router, or any other similar microcomputer-based device capable of accessing and using a Wi-Fi network or a cellular network.

Spectrum Access Service (SAS) 152 may comprise a central database that may receive requests and, in response to the requests, allocate CBRS frequency spectrum on-demand (e.g., temporally) to CBSDs. This frequency spectrum may be allocated for a zone (e.g., cell). The zone's size may depend on the CBSD characteristics and an assumption of free path loss (where obstacles may be ignored), for a configurable time. The user of this temporal spectrum slice may then be charged based on the utilization time and slice (bandwidth) size by the entity providing the access.

The elements described above of wireless network 100 (e.g., WLC 106, DNAC 108, first AP 124, second AP 126, third AP 128, fourth AP 130, fifth AP 132, sixth AP 134, seventh AP 136, first SD 138, second SD 140, third SD 142, fourth SD 144, fifth SD 146, sixth SD 148, seventh SD 150, and SAS 152) may be practiced in hardware and/or in software (including firmware, resident software, microcode, etc.) or in any other circuits or systems. The elements of wireless network 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of wireless network 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of wireless network 100 may be practiced in a computing device 400.

Figure 2:
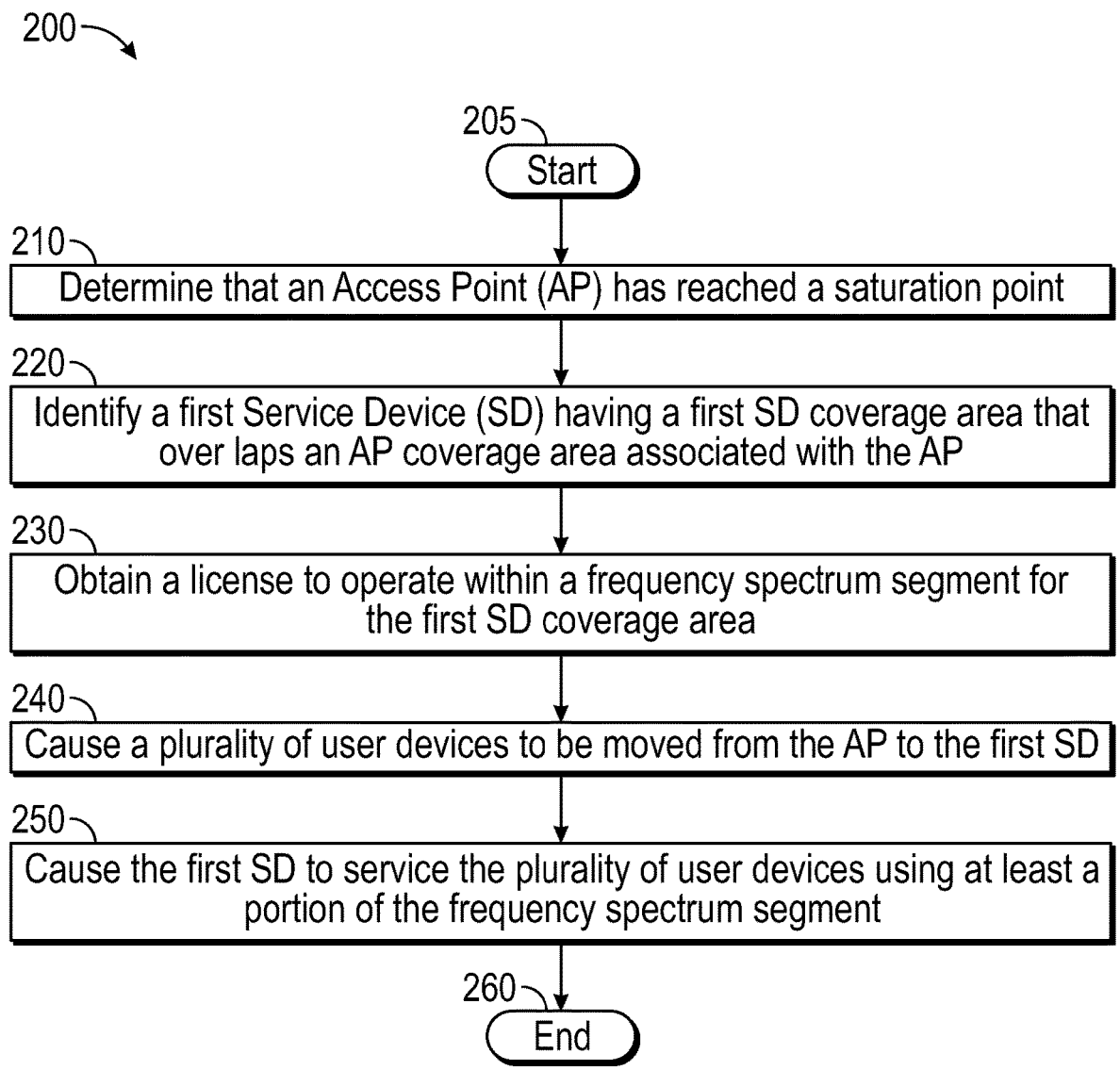
FIG. 2 is a flow chart of a method for providing load balancing for saturated wireless.

FIG. 2 is a flow chart setting forth the general stages involved in a method 200 consistent with embodiment of the disclosure for providing load balancing for saturated wireless. Method 200 may be implemented using computing device 400 (e.g., controller 106 or DNAC 108) as described in more detail below with respect to FIG. 4. Ways to implement the stages of method 200 will be described in greater detail below.

Method 200 may begin at starting block 205 and proceed to stage 210 where computing device 400 may determine that first AP 124 has reached a saturation point. For example, wireless network 100 may provide a venue with wireless (e.g., Wi-Fi) coverage with the SDs installed across the venue as an overlay. Wireless network 100 may start with the SDs disabled (i.e., radio down state) and the APs enabled.

Next, when a wireless client device joins, the association phase may include an Information Element (IE) relevant to CBRS offload. Consistent with embodiments of the disclosure, in the beacons or probe responses, an AP may indicate a "CBRS overlay" (e.g., a yes/no bit). In the association request, the client device may mark its support for CBRS. In one embodiment, this IE may comprise a capability bit (e.g., CBRS capable yes/no). In other embodiments, the IE may indicate country or band preferences. The IE may also indicate a CBRS preference (e.g., candidate for CBRS offload, or another candidate for CBRS offload, primary traffic <target application bundle name or tuple identifier>, secondary traffic <target application bundle name or tuple identifier>, etc.). In the association response, the AP may indicate CBRS offload registered/accepted, or indicate a different offload mode (e.g., on/off for all traffic, offload only for target application <identifier(s)>, offload criteria failed (wrong asset type, traffic type, etc.).

DNAC 108 may monitor each AP's radio and channel conditions and may evaluate a saturation index. The index may be configurable and may define a threshold beyond which offloading to CBRS becomes desirable. In one embodiment, the threshold may be defined by a network administrator and may be based on singular or combined Key Performance Indices (KPIs) (e.g., Channel Utilization (CU) value, cell overall retry rate, throughput degradation below intended maximum, observed delay/jitter, etc.). Offloading to CBRS may have a financial cost and the network administrator may want to decide the tipping point between acceptable performance loss and CBRS cost.

Figure 3:
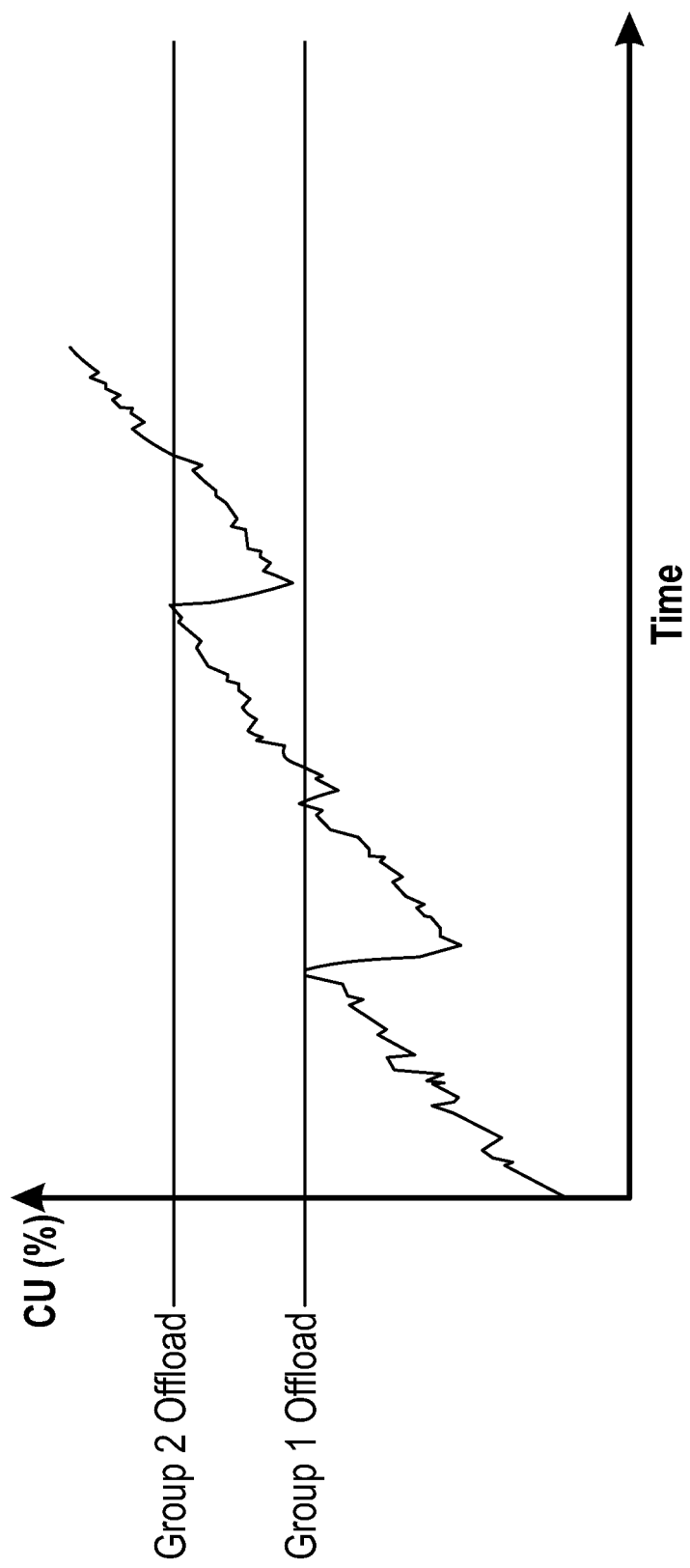
FIG. 3 illustrates offloading flows.

In another embodiment, this threshold may be dynamic and based on a logic similar to inverted Weighted Random Early Detection. In this mode, applications (e.g., possibly also grouped by asset types) may be grouped into categories. When channel utilization, jitter, or delay increase reaches a first threshold, assets (e.g., and their target traffic) matching a first bucket (i.e., group 1) may be flagged as CBRS candidates. Switching some asset traffic to CBRS, as illustrated by FIG. 3, may temporarily reduce the wireless saturation metric. However, as the saturation keeps increasing and reaches a second (i.e., higher than the first) threshold, assets (and their target traffic) matching a second bucket (i.e., group 2) may get flagged as CBRS candidates. The process may repeat until all intended assets and their traffic flows are flagged to be moved to CBRS.

In yet another embodiments, DNAC 108 may have a map of the facility (i.e., venue) with the location of the APs and SDs. Using information from Radio Resource Management (RRM), controller 106, and SAS 152, client load and performance data saturation KPIs may be mapped.

From stage 210, where computing device 400 determines that first AP 124 has reached a saturation point, method 200 may advance to stage 220 where computing device 400 may identify first SD 138 as having a first SD coverage area that overlaps a first AP coverage area associated with the first AP 124. For example, as saturation on each AP increases, DNAC 108 may identify which SDs are present with overlapping coverage areas of the saturated APs.

Once computing device 400 identifies first SD 138 as having the first SD coverage area that overlaps the AP coverage area associated with first AP 124 in stage 220, method 200 may continue to stage 230 where computing device 400 may obtain a license to operate within a frequency spectrum segment for the first SD coverage area. For example, DNAC 108 or controller 106 may integrate with SAS 152 under its domain. Each SD may be uniquely identified along with its geo-location. Consistent with embodiments of the disclosure, each SD may not register directly into SAS 152. Instead, each SD may register to DNAC 108, and DNAC 108 may act as a proxy and may identify to SAS 152 and register as each individual SD.

DNAC 108 may connect to SAS 152 and request a first spectrum segment for this location. The request may be as small as 10 MHz or as large as 100 MHz for example. CBRS spectral efficiency may be high, as such, its performance degradation slope may be flatter than legacy (e.g., collision-based) Wi-Fi, and similar to that of scheduled Wi-Fi (e.g., Orthogonal frequency-division multiple access (OFDMA)). As such, the requested spectrum width may depend on the saturation slope (e.g., speed at which the first offload threshold is reached). In addition, the obtained spectrum segment may not necessarily be allocated to the first SD 138 (e.g., DNAC 108 may obtain, from SAS 152, 40 MHz, but may only enable first SD 138 with 10 MHz). DNAC 108 may obtain, from SAS 152, less bandwidth than what it asked for and may enable first SD 138 with what it obtained or less than what it obtained.

After computing device 400 obtains the license to operate within the frequency spectrum segment for the first SD coverage area in stage 230, method 200 may proceed to stage 240 where computing device 400 may cause a plurality of user devices to be moved from first AP 124 to first SD 138. For example, DNAC 108 may instruct the targeted AP (e.g., first AP 124) to move a first bucket (e.g., group 1) of assets or flows. In order to accomplish this, first AP 124 may use an action frame structured in a similar fashion as Multiband Operations (MBO) (e.g., move to LTE frame), but that may also contain the CBRS channel and width details.

From stage 240, where computing device 400 causes the plurality of user devices to be moved from first AP 124 to first SD 138, method 400 may advance to stage 250 where computing device 400 may cause first SD 138 to service the plurality of user devices using at least a portion of the frequency spectrum segment. For example, DNAC 108 may continue to monitor first cell 110's Wi-Fi KPIs and also its CBSD conditions. At least two scenarios may be possible. A first scenario may comprise SDs and APs viewed as two different functional nodes. In this first scenario, the SDs may have a separate control and data plane from the Wi-Fi infrastructure. In this case, DNAC 108 or controller 106 may fetch from SAS 152 or from the SD, details about the load and number of client devices served by the SD. In a second scenario, the SDs and the APs may be viewed as the same functional nodes. In this second scenario, DNAC 108 may directly retrieve CBRS performance metrics from the SD.

As DNAC 108 compares the saturation of both AP and the corresponding SD, new thresholds may be reached where DNAC 108 may instruct the AP to offload more traffic. Similarly, Wi-Fi loads may diminish, and DNAC 108 may instruct the SD to return some traffic to the AP. Using a CBRS control channel, the SD may then instruct specific assets to roam to Wi-Fi, with an indication of a target channel. Once computing device 400 cause first SD 138 to service the plurality of user devices using at least the portion of the frequency spectrum segment in stage 250, method 200 may then end at stage 260.

Consistent with embodiments of the disclosure, DNAC 108 may observe pre saturation conditions on several APs. At this point, DNAC 108 may run multiple what-if spectrum allocation scenarios against SAS 152. As the spectrum allocation may be geographical (and free path loss observed—open line of sight is expected and obstacles ignored), DNAC 108 may attempt to reserve spectrum, in turn, for each SD at the edge of the venue. As shown in FIG. 1, edge SDs may comprise first SD 138, second SD 140, third SD 142, fourth SD 144, fifth SD 146, and sixth SD 148. DNAC 108 may request spectrum for an edge SD, check the bandwidth obtained, release the spectrum, then request spectrum for the next edge SD, and so on. In the end, DNAC 108 may obtain a potential spectrum map for the venue that wireless network 100 covers. When saturation happens, DNAC 108 may request (e.g., based on the saturation speed slope described above) a target spectrum segment (e.g., 10 MHz), or a segment larger that the target segment needed (e.g., 40 MHz while 10 MHz are needed).

In another embodiment, DNAC 108 may allocate more spectrum to an SD as saturation increases, or release the unused excess then request it immediately for a neighboring, inner SD. Seventh SD 150 may comprise an inner SD. Because the SD is inner, it may not present a larger collision space than the edge SDs. In other words, if the edge SD could use this segment without colliding with a neighboring system, then the inner SD may also not collide with the neighboring system. This process may ensure that the spectrum is locked and maintained available if the saturation slope is stiff. When saturation decreases on the Wi-Fi link (APs), and as more assets/traffic flows are returned to Wi-Fi, DNAC 108 may release CBRS segments until all spectrum is de-allocated and all SDs are returned to their off/disabled mode, thus stopping CBRS spectrum license costs when they are not needed.

Figure 4:
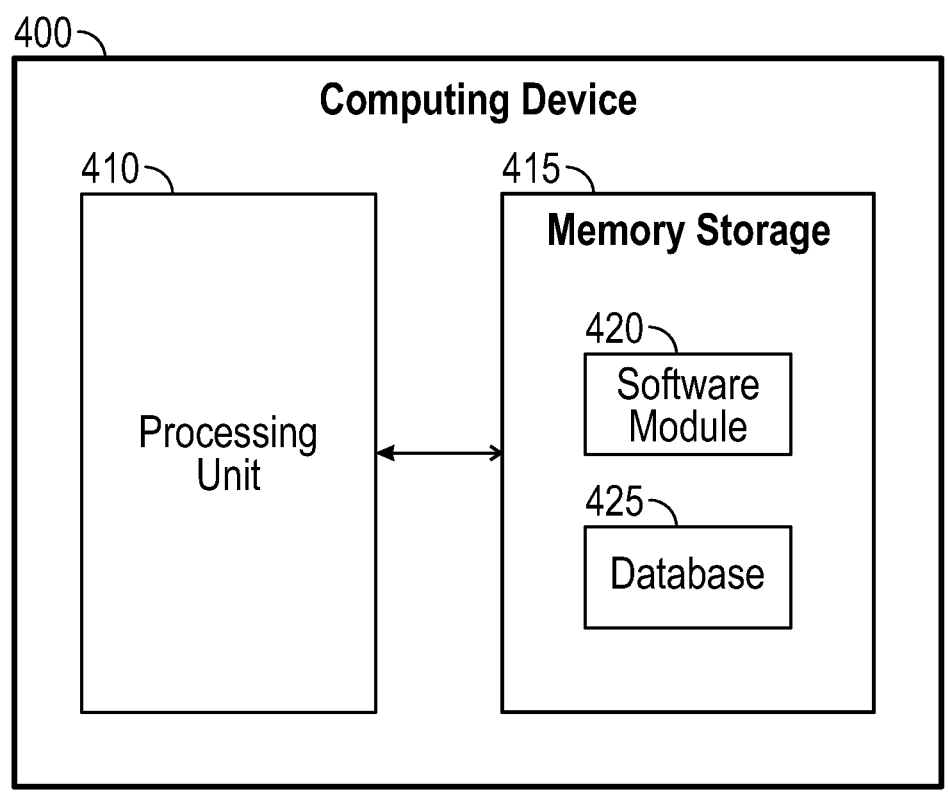
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing load balancing for saturated wireless as described above with respect to FIG. 2. Computing device 400, for example, may provide an operating environment for WLC 106, DNAC 108, first AP 124, second AP 123, third AP 128, fourth AP 130, fifth AP 132, sixth AP 134, seventh AP 136, first SD 138, second SD 140, third SD 142, fourth SD 144, fifth SD 146, sixth SD 148, seventh SD 150, or SAS 152. WLC 106, DNAC 108, first AP 124, second AP 123, third AP 128, fourth AP 130, fifth AP 132, sixth AP 134, seventh AP 136, first SD 138, second SD 140, third SD 142, fourth SD 144, fifth SD 146, sixth SD 148, seventh SD 150, and SAS 152 may operate in other environments and are not limited to computing device 400.

Computing device 400 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A system comprising:
    identifying a first Service Device (SD) having a first SD coverage area that overlaps an Access Point (AP) coverage area associated with the AP;
    obtaining a license to operate within a frequency spectrum segment for the first SD coverage area; and
    causing a plurality of user devices to be moved from the AP to the first SD, wherein each user device of the plurality of user devices, when it associates with the AP, sends an association request comprising an indication that the user device supports being a candidate for Citizens Broadband Radio Service (CBRS) offload, and wherein the AP indicates, in an association response to the association request, that CBRS offload is registered for the user device, and wherein causing the plurality of user devices to be moved from the AP to the first SD comprises
    causing, based on the association response, the first SD to service the plurality of user devices using at least a portion of the frequency spectrum segment in response to the first AP reaching a saturation point.

2. The method of claim 1, wherein obtaining the license to operate within the frequency spectrum segment for the first SD coverage area comprises obtaining, by a Software-Defined Network (SDN) controller that controls a network that includes the AP, the license from a Spectrum Access Service (SAS) wherein the SDN serves as a proxy for the first SD in obtaining the license.

3. The method of claim 1, wherein the plurality of user devices are associated with a predetermined category.

4. The method of claim 3, wherein the predetermined category comprises devices associated with at least one of the following: security cameras in a venue associated with the AP, devices associated with security staff in the venue associated with the AP, and devices associated with operational staff in the venue associated with the AP.

5. The method of claim 1, further comprising allocating a portion of the frequency spectrum segment to a second SD that is not on an edge of a network comprising the first SD and the AP wherein the first SD is on the edge of the network comprising the first SD and the AP.

6. The method of claim 1, wherein the first SD comprises a Citizens Broadband Radio Service Device (CBSD).

7. The method of claim 1, further comprising determining, by a computing device, that the AP has reached the saturation point.

8. The method of claim 7, wherein determining that the AP has reached the saturation point comprises determining that the AP has reached the saturation point based on at least one of the following: a channel utilization value; cell overall retry rate of a cell in which the AP is located; throughput degradation of the AP below an intended maximum; observed delay; and observed jitter.

9. The method of claim 7, further comprising:
    determining that the AP has gone below the saturation point;
    causing, in response to determining that the AP has gone below the saturation point, the plurality of user devices to be moved from the first SD to the AP; and
    surrendering the license to operate within the frequency spectrum segment.

10. A system comprising:
    a memory storage; and
    a processing unit coupled to the memory storage, wherein the processing unit is operative to:
        identify a first Service Device (SD) having a first SD coverage area that overlaps an Access Point (AP) coverage area associated with the AP;
        obtain a license to operate within a frequency spectrum segment for the first SD coverage area; and
        cause a plurality of user devices to be moved from the AP to the first SD, wherein each user device of the plurality of user devices, when it associates with the AP, sends an association request comprising an indication that the user device supports being a candidate for Citizens Broadband Radio Service (CBRS) offload, and wherein the AP indicates, in an association response to the association request, that CBRS offload is registered for the user device, and wherein the processing unit being operative to cause the plurality of user devices to be moved from the AP to the first AD comprises the processing unit being operative to cause, based on the association response, the first SD to service the plurality of user devices using at least a portion of the frequency spectrum segment in response to the first AP reaching a saturation point.

11. The system of claim 10, wherein the plurality of user devices are associated with a predetermined category.

12. The system of claim 11, wherein the predetermined category comprises devices associated with at least one of the following: security cameras in a venue associated with the AP, devices associated with security staff in the venue associated with the AP, and devices associated with operational staff in the venue associated with the AP.

13. The system of claim 10, wherein the processing unit is further operative to allocate a portion of the frequency spectrum segment to a second SD that is not on an edge of a network comprising the first SD and the AP wherein the first SD is on the edge of the network comprising the first SD and the AP.

14. The system of claim 10, wherein the first SD comprises a Citizens Broadband Radio Service Device (CBSD).

15. A non-transitory computer-readable medium that stores a set of instructions which when executed perform a method executed by the set of instructions comprising:
   identifying a first Service Device (SD) having a first SD coverage area that overlaps an Access Point (AP) coverage area associated with the AP;
   obtaining a license to operate within a frequency spectrum segment for the first SD coverage area; and
   causing a plurality of user devices to be moved from the AP to the first SD, wherein each user device of the plurality of user devices, when it associates with the AP, sends an association request comprising an indication that the user device supports being a candidate for Citizens Broadband Radio Service (CBRS) offload, and wherein the AP indicates, in an association response to the association request, that CBRS offload is registered for the user device, and wherein causing the plurality of user devices to be moved from the AP to the first AD comprises causing, based on the association response, the first SD to service the plurality of user devices using at least a portion of the frequency spectrum segment in response to the first AP reaching a saturation point.

16. The non-transitory computer-readable medium of claim 15, wherein obtaining the license to operate within the frequency spectrum segment for the first SD coverage area comprises obtaining, by a Software-Defined Network (SDN) controller that controls a network that includes the AP, the license from a Spectrum Access Service (SAS) wherein the SDN serves as a proxy for the first SD in obtaining the license.

17. The non-transitory computer-readable medium of claim 15, wherein the plurality of user devices are associated with a predetermined category.

18. The non-transitory computer-readable medium of claim 17, wherein the predetermined category comprises devices associated with at least one of the following: security cameras in a venue associated with the AP, devices associated with security staff in the venue associated with the AP, and devices associated with operational staff in the venue associated with the AP.

19. The non-transitory computer-readable medium of claim 15, further comprising allocating a portion of the frequency spectrum segment to a second SD that is not on an edge of a network comprising the first SD and the AP wherein the first SD is on the edge of the network comprising the first SD and the AP.

20. The non-transitory computer-readable medium of claim 15, wherein the first SD comprises a Citizens Broadband Radio Service Device (CBSD).

* * * * *